United States Patent
Lindoff et al.

(10) Patent No.: US 9,332,570 B2
(45) Date of Patent: May 3, 2016

(54) ACCESS RESPONSE SIGNALING IN A CELLULAR COMMUNICATION SYSTEM

(75) Inventors: Bengt Lindoff, Bjärred (SE); Johan Nilsson, Höllviken (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 225 days.

(21) Appl. No.: 13/411,008

(22) Filed: Mar. 2, 2012

(65) Prior Publication Data

US 2013/0230016 A1     Sep. 5, 2013

(51) Int. Cl.
    *H04W 72/04*     (2009.01)
    *H04W 74/00*     (2009.01)
    *H04L 5/00*     (2006.01)

(52) U.S. Cl.
    CPC ........... *H04W 74/006* (2013.01); *H04L 5/0053* (2013.01); *H04L 5/0064* (2013.01); *H04L 5/0007* (2013.01)

(58) Field of Classification Search
    CPC ........... H04L 5/0007; H04W 72/0413; H04W 72/04; H04W 74/006; H04W 28/0215; H04W 4/005–4/006
    USPC ........................................................ 370/330
    See application file for complete search history.

(56) References Cited

U.S. PATENT DOCUMENTS

| | | | | |
|---|---|---|---|---|
| 6,072,784 | A * | 6/2000 | Agrawal et al. | 370/311 |
| 2004/0156328 | A1 * | 8/2004 | Walton et al. | 370/313 |
| 2004/0157602 | A1 * | 8/2004 | Khawand | 455/434 |
| 2010/0165931 | A1 * | 7/2010 | Nimbalker et al. | 370/329 |
| 2010/0284346 | A1 * | 11/2010 | Rudrapatna et al. | 370/329 |
| 2011/0223900 | A1 * | 9/2011 | Yu et al. | 455/422.1 |
| 2011/0235558 | A1 | 9/2011 | Diachina et al. | |
| 2011/0244907 | A1 | 10/2011 | Golaup et al. | |
| 2011/0287776 | A1 * | 11/2011 | Vujcic | 455/452.1 |

(Continued)

FOREIGN PATENT DOCUMENTS

| | | |
|---|---|---|
| EP | 2369883 A1 | 9/2011 |
| EP | 2 373 110 A2 | 10/2011 |
| WO | 2011/100596 A2 | 8/2011 |

OTHER PUBLICATIONS

3GPP TS 25.214 V5.11.0 (Jun. 2005), Technical Specification, 3rd Generation Partnership Project; Technical Specification Group Radio Access Network; Physical layer procedures (FDD) (Release 5) published Jun. 2005.*

(Continued)

*Primary Examiner* — Khaled Kassim
*Assistant Examiner* — Zhaohui Yang
(74) *Attorney, Agent, or Firm* — Leffler Intellectual Property Law, PLLC; Kenneth B. Leffler

(57) ABSTRACT

A network node that serves a cell in a cellular communication system is operated. An air interface of the cellular communication system is divided up into sequentially occurring frames, each of the frames comprising a plurality of sequentially occurring sub-frames, each of the sub-frames comprising a plurality of sequentially occurring symbols. Operation includes receiving and detecting a request signal transmitted by a device within the cell. Based at least in part on a characteristic of the request signal that is indicative of one or more device capabilities of the device, an associated time/frequency position for transmitting a response signal is ascertained. The response signal is transmitted at the ascertained time/frequency position.

30 Claims, 14 Drawing Sheets

(56) References Cited

U.S. PATENT DOCUMENTS

2011/0317636 A1    12/2011  Diachina et al.
2012/0236803 A1*    9/2012  Vujcic ......................... 370/329
2012/0281530 A1*   11/2012  Sambhwani et al. ......... 370/230

OTHER PUBLICATIONS

EPO Search Report, mailed May 17, 2013, in connection with International Application No. PCT/EP2013/053708 (all pages).
EPO Written Opinion, mailed May 17, 2013, in connection with International Application No. PCT/EP2013/053708 (all pages).
Huawei et al. "Bandwidth reduction for low cost MTC UE and text proposal" 3GPP Draft R1-120051, RAN WG1, Dresden, Germany, Feb. 6-10, 2012, XP050562638 (all pages).
Alcatel-Lucent Shanghai Bell et al. "Discussion on RACH design for MTC" 3GPP Draft R2-101407, RAN WG2, San Francisco, California, USA, Feb. 15, 2010, XP050421660 (all pages).
Ipwireless Inc. "Review of approaches for bandwidth reduction for low complexity MTC LTE UEs" 3GPP Draft R1-114267, RAN WG1, San Francisco, California, USA, Nov. 9, 2011, XP050562333 (all pages).
Lien, A. et al. "Toward ubiquitous massive accesses in 3GPP machine-to-machine communications" IEEE Communications Magazine, Apr. 2011, No. 4, pp. 66-74.
Maeder, A. et al. "Random Access Resource Allocation for Large Number of Devices" IEEE S802.16p-rg-11/0028. Date submitted Feb. 7, 2011.
3GPP TS 36.201, V10.0.0 Technical Specification Group Radio Access Network; Evolved Universal Terrestrial Radio Access (E-UTRA); LTE physical layer; General description (Release 10), Dec. 2010.

* cited by examiner

FIG. 1 (PriorArt)

FIG. 2 (PriorArt)

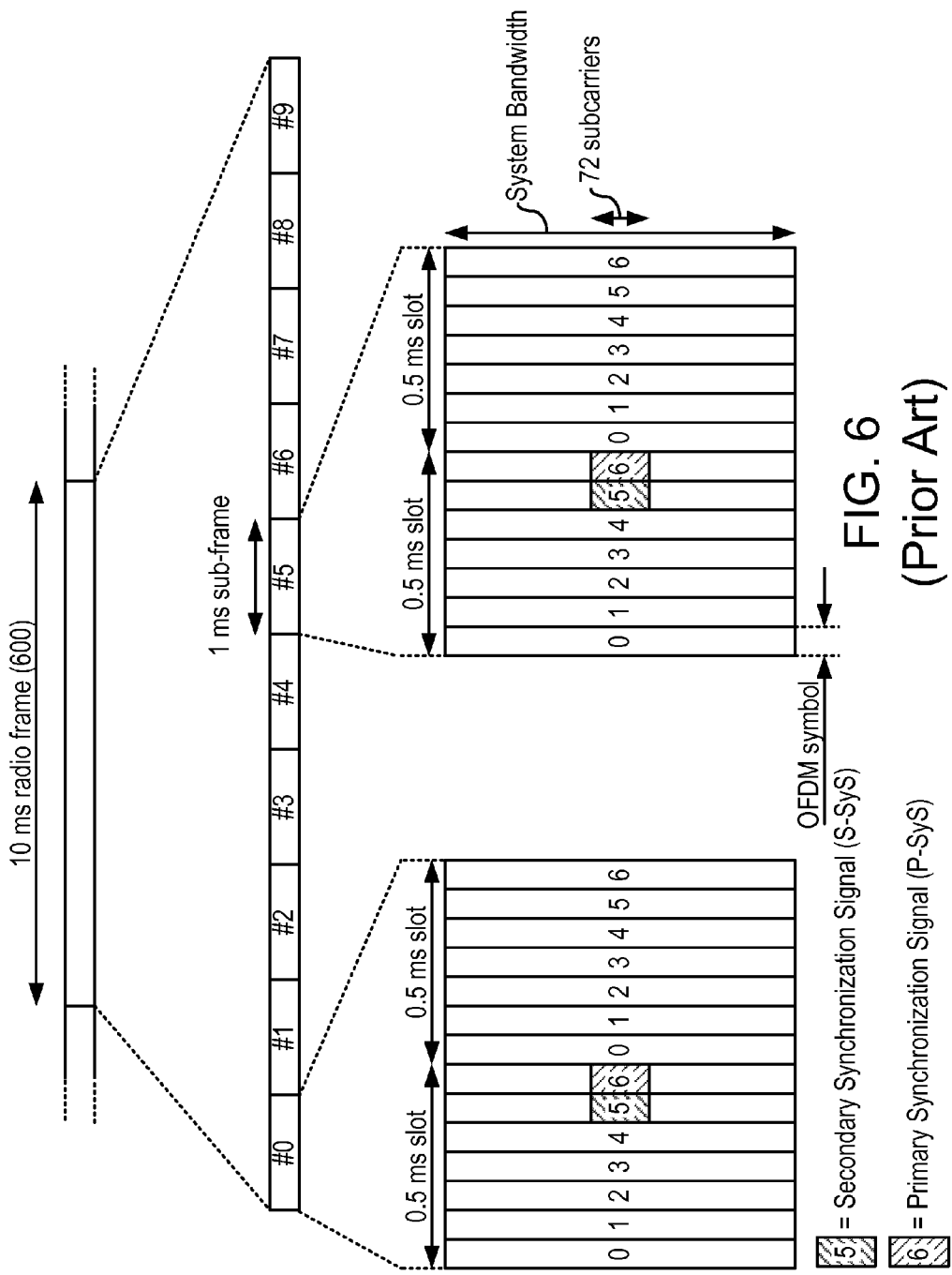

ACCESS RESPONSE SIGNALING IN A CELLULAR COMMUNICATION SYSTEM

BACKGROUND

The present invention relates to cellular communication systems, and more particularly to access response signaling in a cellular communication system.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As the mobile device moves from one cell to another, the network hands over responsibility for serving the mobile device from the presently-serving cell to the "new" cell. In this way, the user of the mobile device experiences continuity of service without having to reestablish a connection to the network. FIG. 1 illustrates a cellular communication system providing a system coverage area 101 by means of a plurality of cells 103.

The radio frequency spectrum that is utilized to provide mobile communication services is a limited resource that must be shared in some way among all of the users in a system. Therefore, a number of strategies have been developed to prevent one mobile device's use (both transmitting and receiving) of radio spectrum from interfering with that of another, as well as to prevent one cell's communications from interfering with those of another. Some strategies, such as Frequency Division Multiple Access (FDMA) involve allocating certain frequencies to one user to the exclusion of others. Other strategies, such as Time Division Multiple Access (TDMA) involve allowing multiple users to share one or more frequencies, with each user being granted exclusive use of the frequencies only at certain times that are unique to that user. FDMA and TDMA strategies are not mutually exclusive of one another, and many systems employ both strategies together, one example being the Global System for Mobile communication (GSM).

As designers strive to develop systems with higher and higher capabilities (e.g., higher communication speeds, resistance to interference, higher system capacity, etc.), different technical features are incorporated, including different means for sharing radio frequency resources. To take one of a number of possible examples, the Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths and also carrier frequencies. Furthermore, E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, Orthogonal Frequency Division Multiple Access (OFDMA) technology is used in the downlink (i.e., the communications link from the base station to the User Equipment—"UE") because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

The use of machine type communication (MTC) over cellular communication systems, such as LTE, is increasingly gaining attention as operators are planning for replacement of older communication systems, like GSM, by newer (e.g., LTE) networks. MTC devices, such as connected sensors, alarms, remote control devices and the like, are common in GSM networks where they co-exist with more conventional UEs (e.g., mobile phones). MTC devices typically need to communicate only small amounts of data, and are therefore generally characterized by a modest bit rate and sparse communication activity. The number of MTC devices is expected to increase dramatically during the next few years, with predictions indicating that in only a few years, there will be hundreds of billions of such devices connected to cellular systems like LTE.

An important requirement of MTC devices is that they should have low cost as well as low power consumption. A device's power consumption can be a function of a number of cellular system parameters. One example that typically drives power consumption is the amount of time the device needs to monitor a control channel for information, such as the time the device needs to monitor (decode) a control channel signal to ascertain whether it includes an access request signal. A common example of a response signal is the Random Access Response (RAR) signal, which is a network node's acknowledgment of a Random Access signal transmitted by the device on a Random Access Channel (RACH) and received by the network node. In mobile broadband scenarios (e.g., the scenario the LTE system is primarily built on) it is important that the RAR be transmitted quickly after occurrence of the RACH in order to reduce latency. However, since a device's utilization of the RACH is an event that cannot be predicted by the network node, responding quickly to a random access burst typically means interrupting the scheduling of another user's data transmission. This in turn reduces the capacity/spectral efficiency of the system. Therefore, in order to overcome this problem to some extent, the device needs to be allocated a time window, longer than the actual RAR, during which the RAR can be transmitted.

FIG. 2 is a signal timing diagram of a conventional Random Access procedure such as is used in a conventional LTE (or comparable) system. The air interface is divided up into sequentially occurring sub-frames, of which the sub-frame 201 is but one example. It is assumed in this illustration that the mobile device has already synchronized itself to the network node. In FIG. 2, uplink (UL—from device to network node) and downlink (DL—from network node to device) timelines are shown separate and aligned with one another.

Not shown in FIG. 2 is earlier signaling that has been exchanged between the device and the network node by which the network node has provided the device with information about what signature to use when it is ready to make contact with the network. In this illustration, the device transmits a random access signal on a RACH channel 203, indicating that it intends to get in contact with the network node for the purpose of, for example, transmitting data information. The RACH is typically allocated a certain frequency bandwidth in one or more sub-frames. (This example assumes that the RACH 203 fits within a single sub-frame.) Typically, the RACH is of shorter duration than an entire sub-frame in order to cope with the fact that, at the time of the device's initial contact with the network node, the travel distance (and hence path delay) of the radio signal between the network node and the device is unknown.

The device turns on its transmitter (device activation step 205) and transmits the specific RACH signature (previously provided by the network node) that identifies the terminal to the network node. The network node detects the RACH signal some number of sub-frames later (step 207) and in response, transmits an RAR signal to the device (step 209), indicating procedures for further communication.

As mentioned earlier, in order to avoid interrupting the scheduling of another user's data transmission and thereby trying to optimize usage of the radio frequency spectrum and of the scheduler resources, a RACH response window 211 is defined. The network node's RAR signal can be transmitted to the device in any one of the sub-frames spanned by the RACH window 211 The RAR window 211, signaled (or broadcasted) from the network node is typically 5-10 sub-frames in duration, and hence the device needs to have the receiver (RX) on during the entire RAR window for monitoring of the RAR (device activation step 213). Considering the desire to keep power consumption in an MTC device very low, the long receiver "on" time relative to the short RAR information that is to be captured (a ratio that is on the order of 5-10 to 1), it is apparent that this is not a good solution.

There is therefore a need for improved signaling methods and apparatuses in cellular systems such as, but not limited to, an LTE system that addresses one or more of the shortcomings described above.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in, for example, methods and apparatuses for operating a network node that serves a cell in a cellular communication system, wherein an air interface of the cellular communication system is divided up into sequentially occurring frames, each of the frames comprising a plurality of sequentially occurring sub-frames, each of the sub-frames comprising a plurality of sequentially occurring symbols. Such operation includes receiving and detecting a request signal transmitted by a device within the cell. Based at least in part on a characteristic of the request signal that is indicative of one or more device capabilities of the device, an associated time/frequency position for transmitting a response signal is ascertained. The response signal is then transmitted at the ascertained time/frequency position.

In an aspect of some but not necessarily all embodiments, the response signal consists of fewer symbols than are contained in a sub-frame. The number of symbols can, in some instances, be as few as one. In some but not necessarily all embodiments, the response signal consists of a number of symbols that is less than a total number of symbols contained within a sub-frame and that is a function of the characteristic of the request signal that is indicative of one or more device capabilities of the device.

In an aspect of some but not necessarily all embodiments, the request is a Random Access Channel (RACH) request and the characteristic of the request signal that is indicative of one or more device capabilities of the device is a RACH signature.

In an aspect of some but not necessarily all embodiments, operation includes ascertaining the characteristic of the request signal that is indicative of one or more device capabilities of the device based on the one or more device capabilities; and transmitting information to the device, wherein the information is indicative of the characteristic of the request signal that is indicative of one or more device capabilities.

In an aspect of some but not necessarily all embodiments, operation includes ascertaining the associated time/frequency position for transmitting a response signal to the device based on the one or more device capabilities.

In an aspect of some but not necessarily all embodiments, a frequency-wise spread of the associated time/frequency position for transmitting the response signal is less than a frequency-wise spread of a symbol.

In an aspect of some but not necessarily all embodiments, each of the symbols is an Orthogonal Frequency Division Multiplexing (OFDM) symbol.

In an aspect of some but not necessarily all embodiments, the request is a Scheduling Request signal and the characteristic of the request signal that is indicative of one or more device capabilities of the device is a Scheduling Grant signal.

In an aspect of some but not necessarily all embodiments, operation includes controlling a scheduler of the network node based on the associated time/frequency position for transmitting the response signal.

In another aspect of embodiments consistent with the invention, methods and apparatuses are provided for operating a device in a cellular communication system having a network node, wherein an air interface of the cellular communication system is divided up into sequentially occurring frames, each of the frames comprising a plurality of sequentially occurring sub-frames, each of the sub-frames comprising a plurality of sequentially occurring symbols. Such operation includes communicating device capability information to the network node and then subsequently receiving information that is indicative of a request procedure and a response procedure to be used by the device when making a request and subsequently monitoring for a request response. A request is transmitted to the network node based on the received information that is indicative of the request procedure, and received signals are monitored to detect a response signal in accordance with the information that is indicative of the response procedure.

In an aspect of some but not necessarily all embodiments, the request procedure is a random access procedure, and the response signal is a random access response signal.

In an aspect of some but not necessarily all embodiments, received information that is indicative of the response procedure indicates a time and/or frequency position at which the response signal will be received.

In an aspect of some but not necessarily all embodiments, the response procedure indicates a duration of a response window that is shorter than a duration of a sub-frame.

BRIEF DESCRIPTION OF THE DRAWINGS

FIG. 6 illustrates the structure of the radio interface of an LTE system.

DETAILED DESCRIPTION

Figure 1:
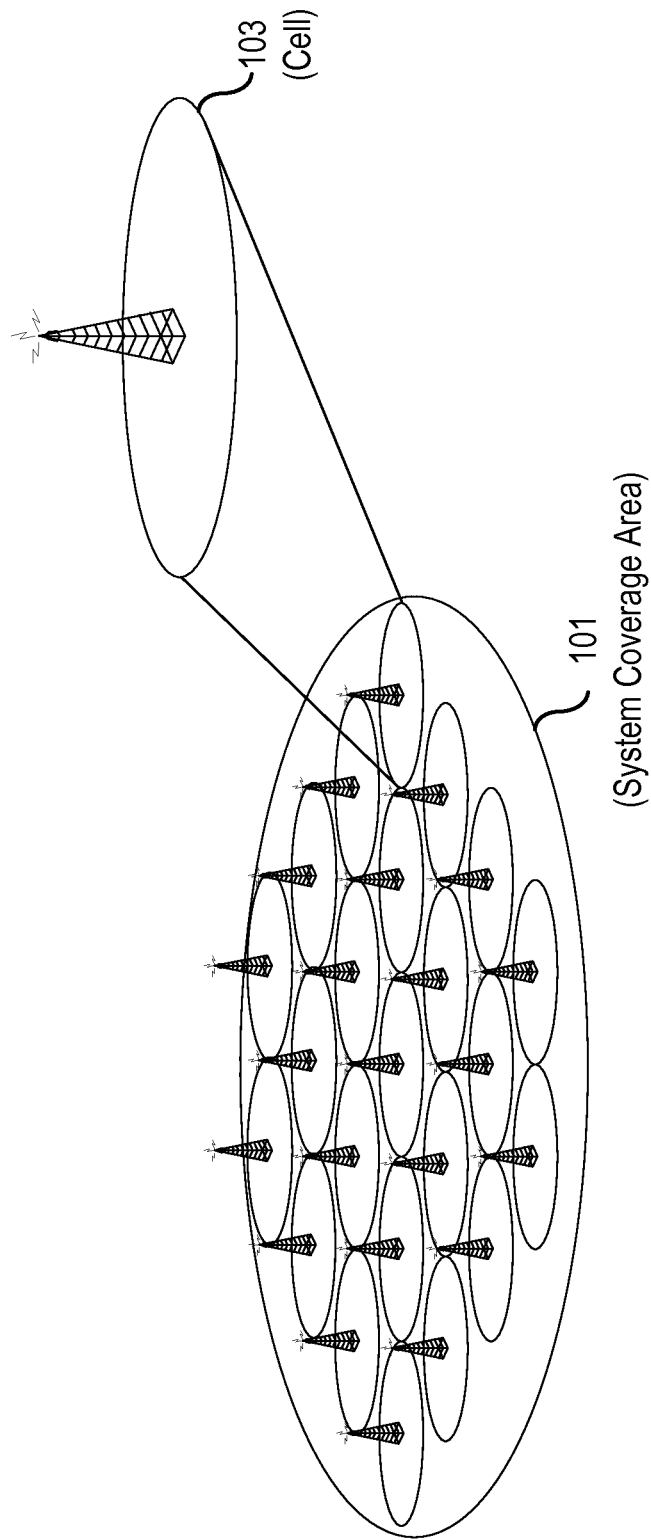
FIG. 1 illustrates a cellular communication system providing a system coverage area by means of a plurality of cells.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In an aspect of embodiments consistent with the invention, a network node that serves a cell in a cellular communication system transmits a response signal responsive to an access request signal received from an MTC device, wherein the cellular communication system is primarily designed to support mobile broadband use, not MTC use. A basic aspect of embodiments consistent with the invention is that the network's response signal is transmitted at a very specific time/frequency position, with the time/frequency position being a function of the device's access request signal signature.

In another aspect, the time/frequency position occupied by the network node's response signal is of shorter duration than an entire sub-frame. For example, in a cellular communication system that defines a sub-frame as spanning some number of transmitted symbols (e.g., an OFDM symbol as is used in LTE systems), the network node's response signal could occupy just a single one of these symbols (e.g., in an LTE system, just one symbol out of a possible 12-14 OFDM symbols that make up one sub-frame).

In another aspect of some but not necessarily all embodiments, the (subset of) symbol(s) need not be dedicated wholly for use by the network node's response signal. Instead, the symbol (or possibly more than one in some embodiments), which is defined as spanning some bandwidth of radio frequency spectrum, can be configured such that only a frequency-wise portion of the symbol's entire bandwidth is used for communicating the network node's response signal.

These and other aspects of embodiments consistent with the invention will now be described in further detail. To facilitate the reader's understanding of the variously described features, the terminology and features associated with an LTE system are used. However, this is done only for the purpose of example, and is not intended to suggest that the various embodiments consistent with the invention are usable only in an LTE system. To the contrary, the various embodiments consistent with the invention are usable in any comparable communication system that presents the same problem as a conventional LTE system (e.g., imposing bandwidth and/or processing power requirements that go beyond what any practical MTC device is capable of satisfying) and provides the ability to allocate resources in a way that is comparable to a conventional LTE system.

Figure 3:
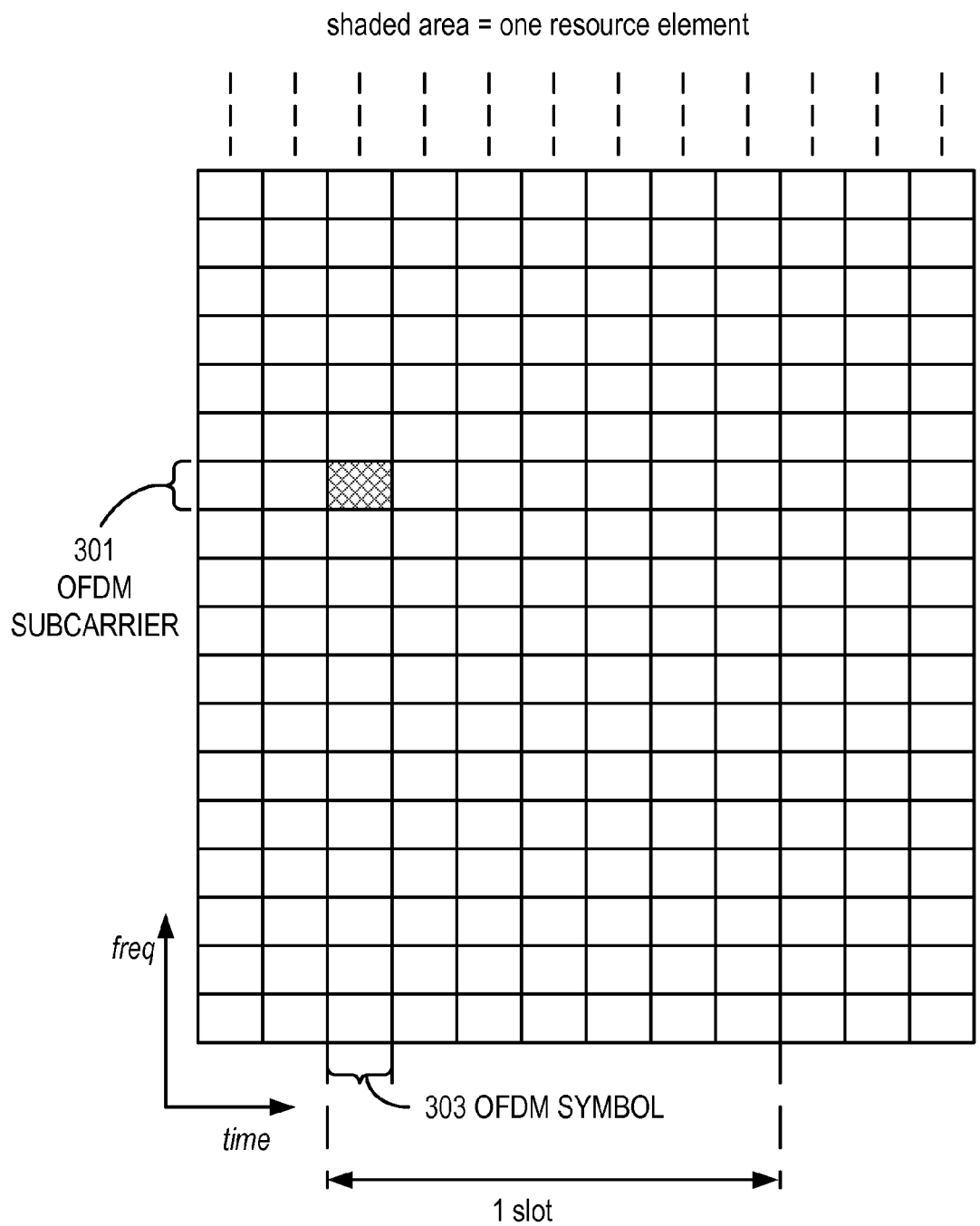
FIG. 3 illustrates a time-frequency grid an exemplary LTE downlink physical resource ("resource element") that corresponds to one OFDM subcarrier during one OFDM symbol interval.

The LTE physical layer downlink transmission is based on OFDM. The basic LTE downlink physical resource can thus be seen as a time-frequency grid as illustrated in FIG. 3, in which each so-called "resource element" corresponds to one OFDM subcarrier during one OFDM symbol interval. In FIG. 3, the intersection of OFDM subcarrier 301 and OFDM symbol 303 is an exemplary resource element (illustrated in cross-hatching).

Figure 4:
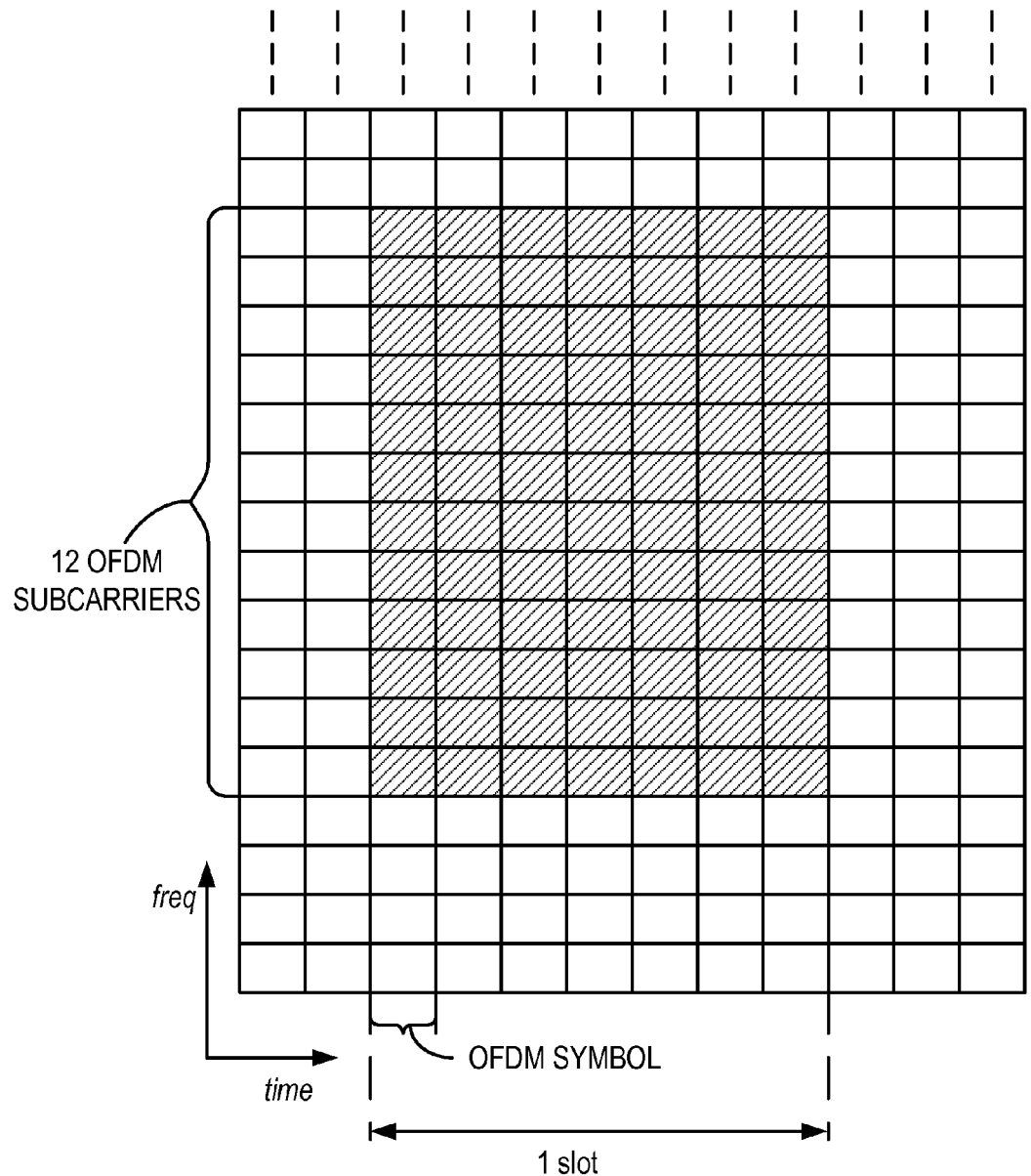
FIG. 4 is a time-frequency grid illustrating how downlink subcarriers in the frequency domain are grouped into resource blocks.

As illustrated in FIG. 4, the downlink subcarriers in the frequency domain are grouped into resource blocks (RBs), where each resource block consists of twelve subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c = 12 \cdot N_{RB} + 1$ where $N_{RB}$ is the maximum number of resource blocks that can be formed from the $12 \cdot N_{RB}$ usable subcarriers. The LTE physical-layer specification actually allows for a downlink carrier to consist of any number of resource blocks, ranging from $N_{RB\text{-}min} = 6$ and upwards, corresponding to a nominal transmission bandwidth ranging from 1.4 MHz up to 20 MHz. This allows for a very high degree of LTE bandwidth/spectrum flexibility, at least from a physical-layer-specification point-of-view.

Figure 5A:
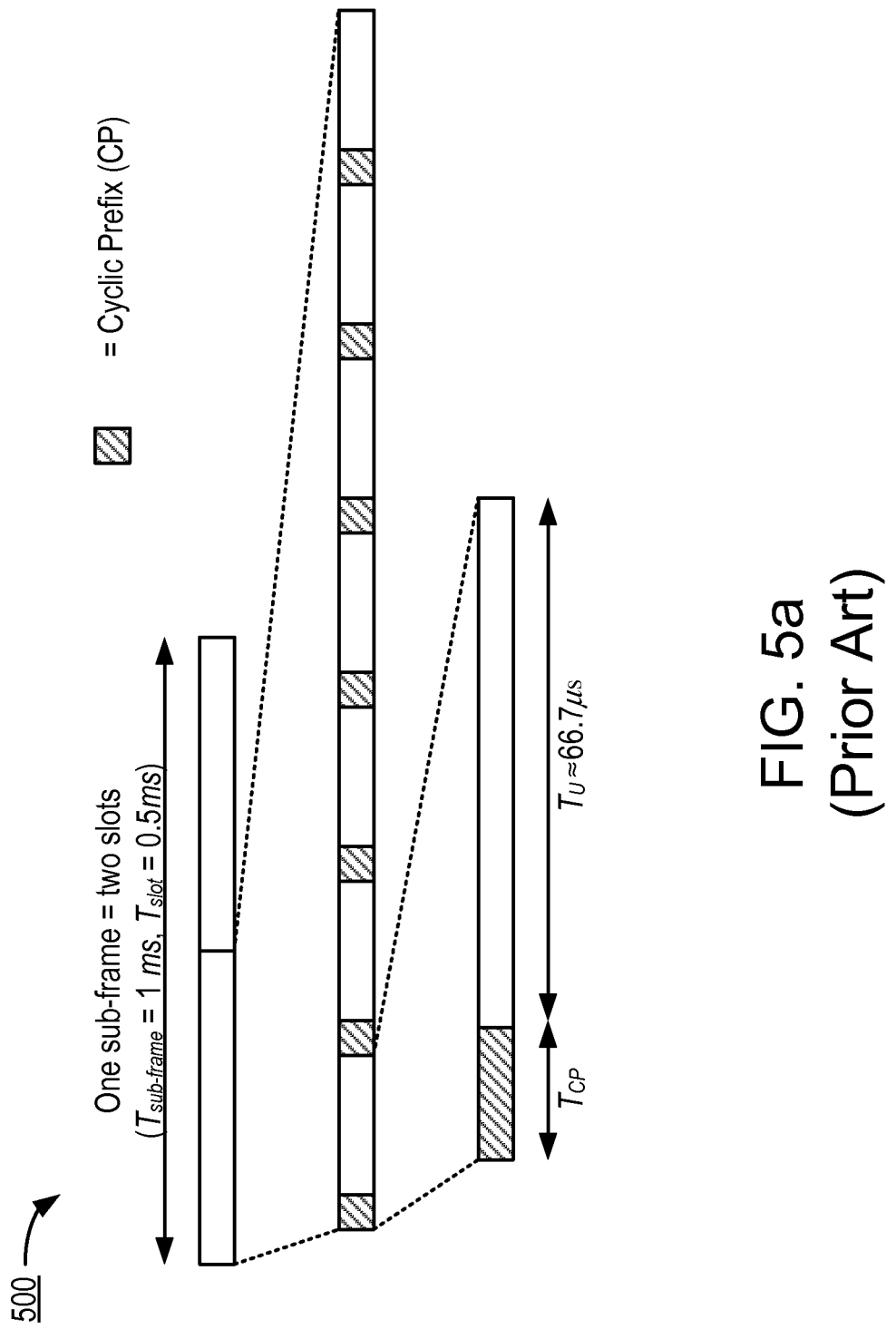
FIG. 5a illustrates a so-called "normal" cyclic prefix length, which allows seven OFDM symbols per slot to be communicated.
Figure 5B:
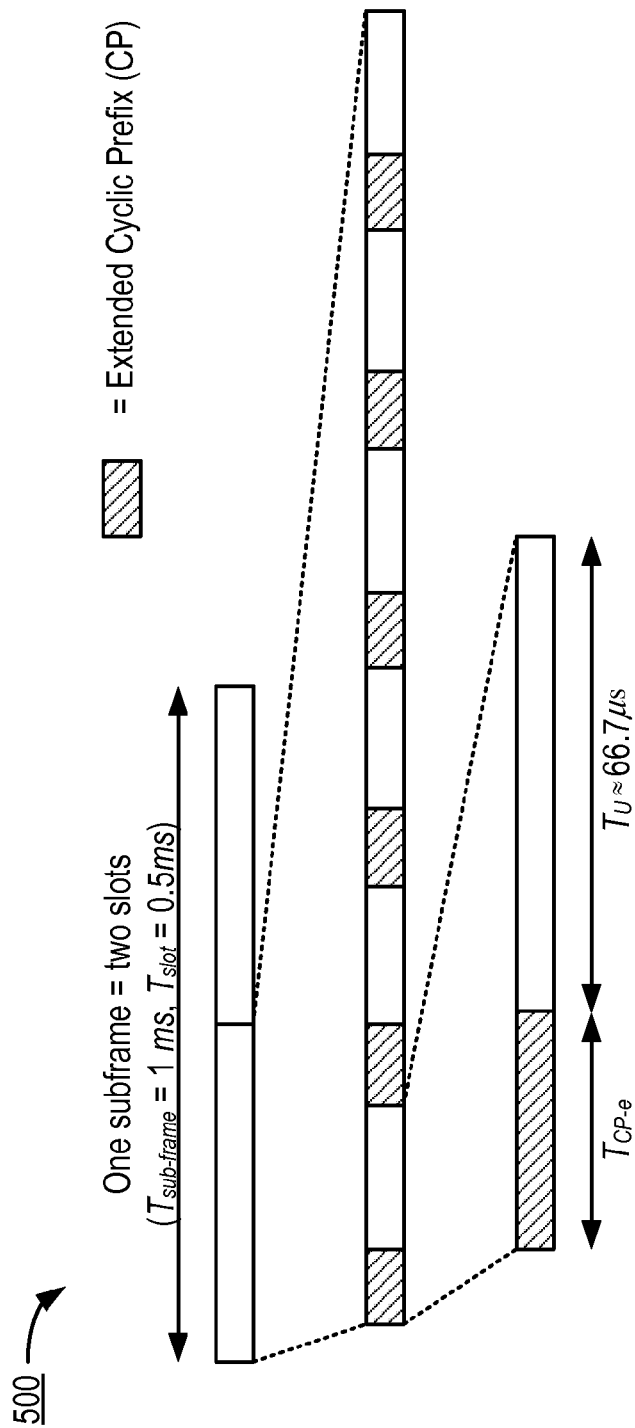
FIG. 5b illustrates an extended cyclic prefix, which because of its longer size, allows only six OFDM symbols per slot to be communicated.

FIGS. 5a and 5b illustrate the time-domain structure for LTE downlink transmission. Each 1 ms subframe 500 consists of two slots of length $T_{slot}=0.5$ ms ($=15360 \cdot T_S$, wherein each slot comprises 15,360 time units, $T_S$). Each slot then consists of a number of OFDM symbols.

A subcarrier spacing $\Delta f=15$ kHz corresponds to a useful symbol time $T_u=1/\Delta f \approx 66.7$ µs ($2048 \cdot T_S$). The overall OFDM symbol time is then the sum of the useful symbol time and the cyclic prefix length $T_{CP}$. Two cyclic prefix lengths are defined. FIG. 5a illustrates a normal cyclic prefix length, which allows seven OFDM symbols per slot to be communicated. The length of a normal cyclic prefix, $T_{CP}$, is $160 \cdot T_S \approx 5.1$ µs for the first OFDM symbol of the slot, and $144 \cdot T_S \approx 4.7$ µs for the remaining OFDM symbols.

FIG. 5b illustrates an extended cyclic prefix, which because of its longer size, allows only six OFDM symbols per slot to be communicated. The length of an extended cyclic prefix, $T_{CP-e}$, is $512 \cdot T_S \approx 16.7$ µs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of $12 \cdot 7=84$ resource elements for the case of normal cyclic prefix (illustrated in FIG. 4), and $12 \cdot 6=72$ resource elements for the case of the extended cyclic prefix (not shown).

Another important aspect of a terminal's operation is mobility, which includes cell search, synchronization, and signal power measurement procedures. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information (SI) on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

In order to reduce the cell-search complexity, cell search for LTE is typically done in several steps that make up a process that is similar to the three-step cell-search procedure of the known Wideband Code Division Multiple Access (WCDMA) system. To assist the terminal in this procedure, LTE provides a primary synchronization signal and a secondary synchronization signal on the downlink. This is illustrated in FIG. 6, which shows the structure of the radio interface of an LTE system. The physical layer of an LTE system includes a generic radio frame 600 having a duration of 10 ms. FIG. 6 illustrates one such frame 600 for an LTE Frequency Division Duplex (FDD) system. Each frame has 20 slots (numbered 0 through 19), each slot having a duration of 0.5 ms which normally consists of seven OFDM symbols. A sub-frame is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. The primary synchronization signal can occupy less bandwidth than does the secondary synchronization signal. In addition to the synchronization signals, part of the operation of the cell search procedure also exploits reference signals that are transmitted at known locations in the transmitted signal.

Figure 7:
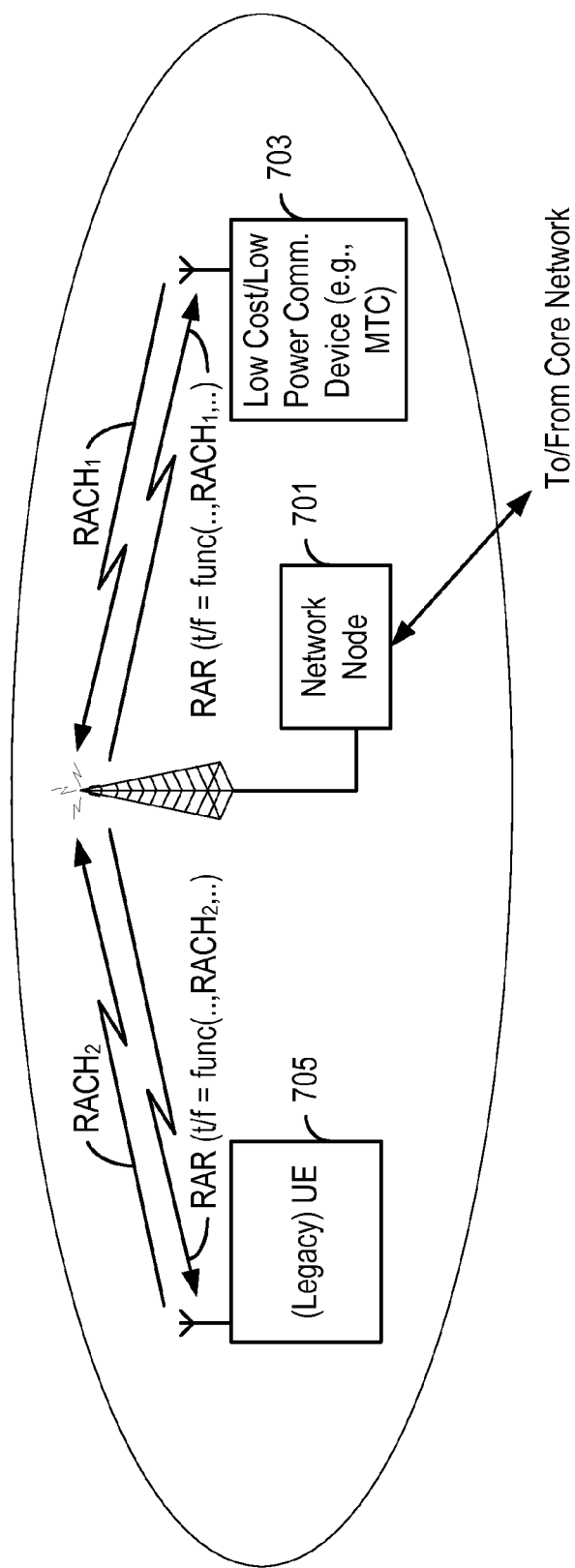
FIG. 7 illustrates a network node that is operated in accordance with some aspects of the invention so as to provide improved random access performance for various types of devices, including MTC devices

FIG. 7 illustrates a network node 701 that is operated in accordance with some aspects of the invention so as to provide improved performance for a low cost/low power communication device (e.g., an MTC device) 703 while continuing to serve a (e.g., legacy) user equipment 705. This involves, among other things, receiving at various times random access requests from the low cost/low power communication device 703 and the user equipment 705, respectively. Each of these random access requests has its own signature to identify the device. In this example, the low cost/low power communication device has its own associated random access signature (represented in the figure by "$RACH_1$"), and the user equipment's random access request has its associated random access signature (represented in the figure by "$RACH_2$"). When any device makes a random access request, the network node 701 uses the signature as a basis for ascertaining a time and frequency during which the responding RAR will be transmitted. It will be understood that there may, but need not be, other bases that are additionally used. Accordingly, the RAR that the network node 701 transmits in response to receipt of the $RACH_1$ signature occupies a time/frequency ("t/f") location that is at least in part a function of $RACH_1$. Similarly, the RAR that the network node 701 transmits in response to receipt of the $RACH_2$ signature occupies a time/frequency location that is at least in part a function of $RACH_2$.

Figure 8:
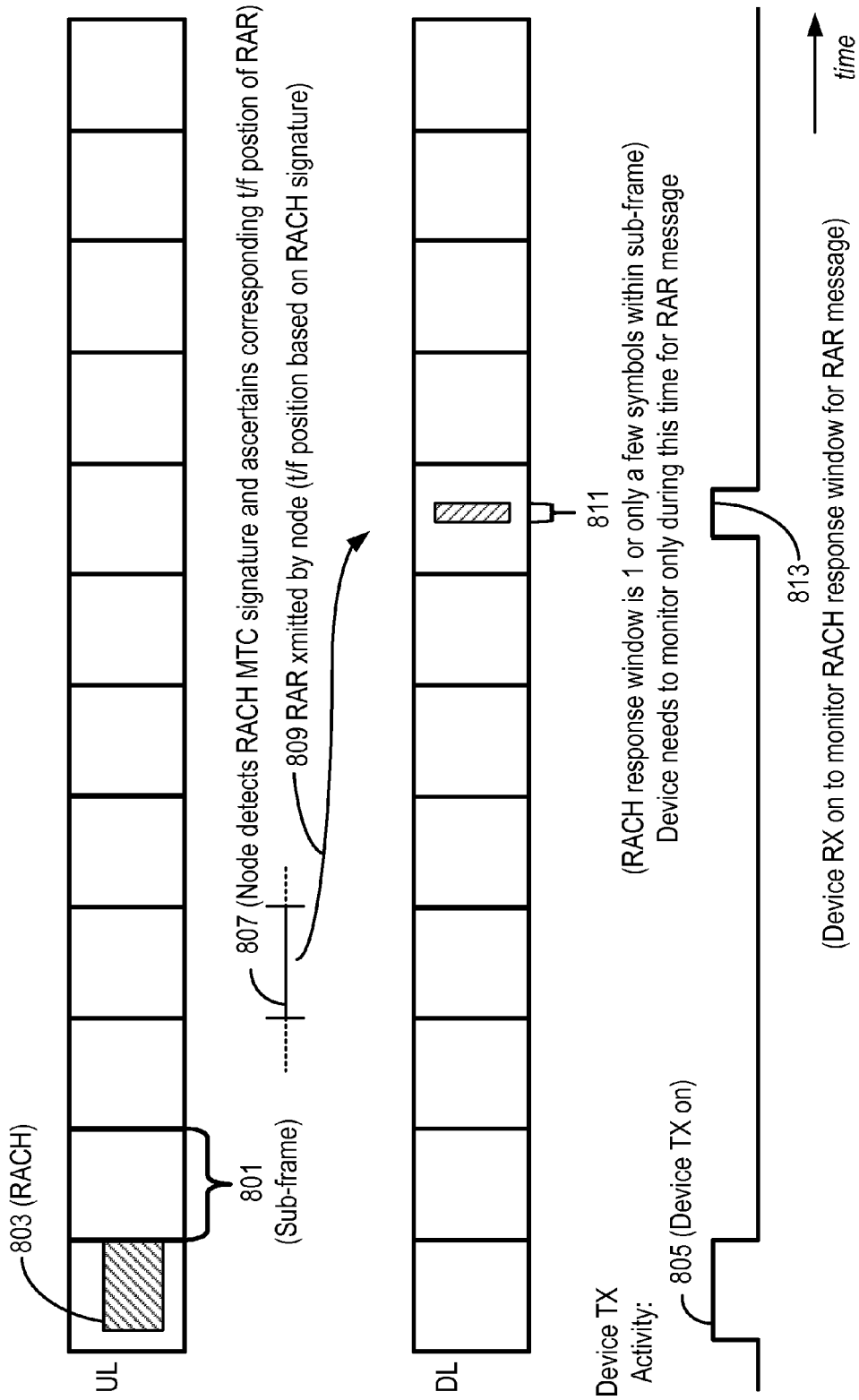
FIG. 8 is a signal timing diagram of a Random Access procedure in accordance with exemplary embodiments that are consistent with the invention.

FIG. 8 is a signal timing diagram of a Random Access procedure in accordance with exemplary embodiments that are consistent with the invention. The air interface is divided up into sequentially occurring sub-frames, of which the sub-frame 801 is but one example. It is assumed in this illustration that the mobile device has already synchronized itself to the network node. In FIG. 8, uplink (UL—from device to network node) and downlink (DL—from network node to device) timelines are shown separate and aligned with one another.

Not shown in FIG. 8 is earlier signaling that has been exchanged between the device and the network node by which the network node has provided the device with information about what signature to use when it is ready to make contact with the network. In this illustration, the device transmits a random access signal on a RACH channel 803, indicating that it intends to get in contact with the network node for the purpose of, for example, transmitting data information. The RACH is typically allocated a certain frequency bandwidth in one or more sub-frames. (This example assumes that the RACH 803 fits within a single sub-frame.) Typically, the RACH is of shorter duration than an entire sub-frame in order to cope with the fact that, at the time of the device's initial contact with the network node, the travel distance (and hence path delay) of the radio signal between the network node and the device is unknown.

The device turns on its transmitter (device activation step 805) and transmits the specific RACH signature (previously provided by the network node) that identifies the terminal to the network node. The network node detects the RACH signal some number of sub-frames later (step 807) and in response, ascertains a time/frequency ("t/f") position preferably within (i.e., smaller than) a sub-frame at which the device will be able to detect the RAR. At the ascertained time/frequency position, the network node transmits the RAR signal to the device (step 809), indicating procedures for further communication.

The device knows, either by standardization or alternatively by means of earlier signaling between the network node and the device, what the RAR signal's time/frequency position will be. Accordingly, The RACH window 811 is very small. Accordingly, the device needs to have the receiver (RX) on only for a sufficient amount of time (device activation step 213) to be able to receive the RAR signal at the expected time.

Figure 9:
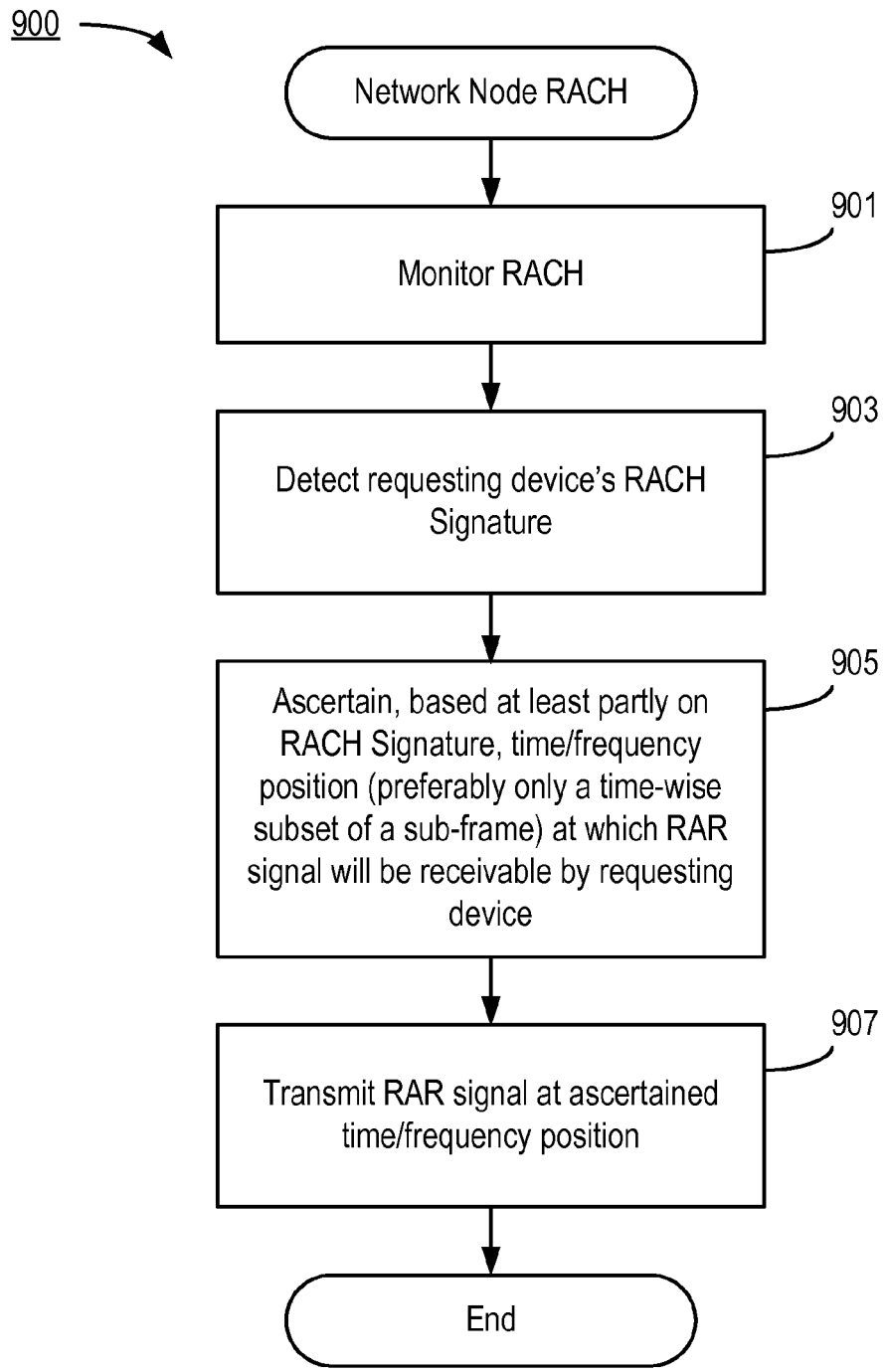
FIG. 9 is, in one respect, a flow chart of steps/processes relating to random access responses performed by a communication system node in accordance with some but not necessarily all exemplary embodiments of the invention.

Consistent with the various principles illustrated but not limited by FIG. 8, FIG. 9 is, in one respect, a flow chart of steps/processes performed by a communication system node in accordance with some but not necessarily all exemplary embodiments of the invention. In another respect, FIG. 9 can be considered to depict exemplary means 900 comprising the various illustrated circuitry (e.g., hard-wired and/or suitably programmed processor) configured to perform the described functions.

The network node listens for the presence of Random Access signals in sub-frames allocated to the RACH in the uplink (step 901). Once a RACH signal is detected, the specific RACH signature is decoded/detected (step 903). Next, a mapping is performed whereby the detected signature is used as at least one basis by which the network node ascertains a certain time/frequency grid location where the RAR signal should be transmitted (step 905). Other bases that can (but need not) be used in conjunction with detected signature for the purpose of ascertaining the certain time/frequency grid location where the RAR signal should be transmitted include, without limitation, the frequency and/or time position of the received Random Access signals. The mapping function is predefined either by standardization (so that the requesting device also able to ascertain by itself what the mapping will be) or by earlier signaling between the network node and the device (in which case the device has previously been informed by the network node what the mapping would be). Means for mapping are exemplified by, without limitation, a look up table, or alternatively circuitry (e.g., suitably programmed processor or a dedicated hardware circuitry configuration or a combination of both) that ascertains a function of the RACH signature (plus any other parameters that may be involved). A function could be, for example and without limitation, based on a signature index.

The spread in time and frequency can be uniform, or alternatively can be different for different signatures. For example, some signatures may correspond to devices that require only one OFDM symbol in time, while other signatures may correspond to devices that require more than one but less than all of the OFDM symbols in a sub-frame. The time spread (and in some embodiments also the frequency spread) could be different in dependence on the amount of information that is needed to be transmitted in the RAR signal. Furthermore, some RACH signatures may correspond to devices that require a longer delay in time prior to RAR signal transmission than other devices. Hence, the time position (relative to the RACH timing) of the RAR signal transmission can be adapted based at least partly on the detected RACH signature.

Having mapped the received RACH signature to a time/frequency position, the network node then transmits the RAR signal at the ascertained time/frequency position (step 907).

Figure 10:
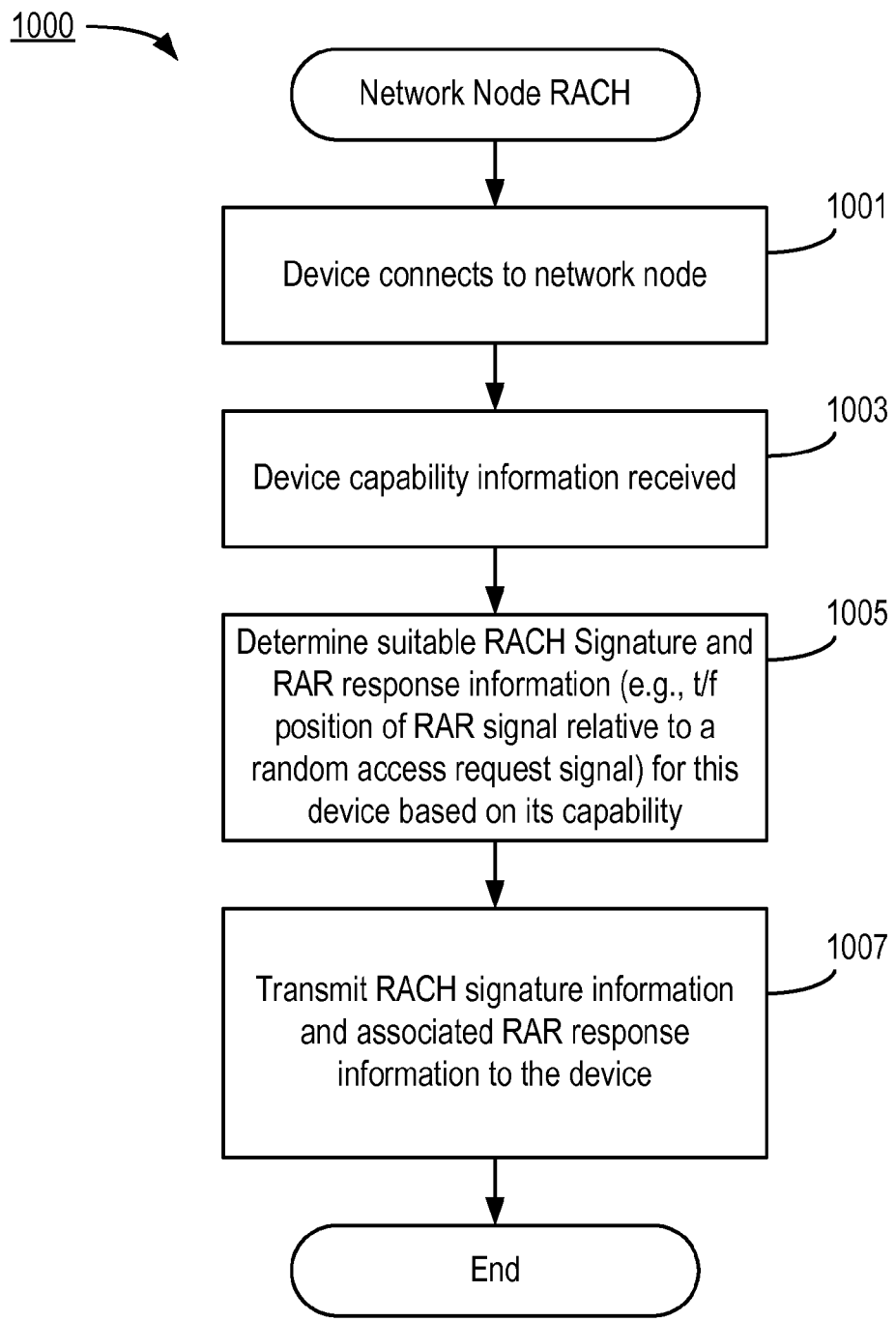
FIG. 10 is, in one respect, a flow chart of steps/processes relating to RACH signature allocation performed by a communication system node in accordance with some but not necessarily all exemplary embodiments of the invention.

FIG. 10 is, in one respect, a flow chart of steps/processes performed by a communication system node in accordance with some but not necessarily all exemplary embodiments of the invention. In another respect, FIG. 10 can be considered to depict exemplary means 1000 comprising the various illustrated circuitry (e.g., hard-wired and/or suitably programmed processor) configured to perform the described functions. In all of these embodiments, FIG. 10 illustrates an exemplary embodiment of how a RACH signature can be allocated.

Initially, the device makes a first connection to the network node (step 1001). This connection can be made by any standardized RACH procedure, without any need to focus on optimized power consumption and/or spectral efficiency. Accordingly, any conventional initial connection technique can be used for this step. Techniques for making such initial connections are described in, for example and without limitation, U.S. patent application Ser. No. 13/398,786, filed on Feb. 16, 2012 (Joakim Axmon et al., "Cellular Communication System Support for Limited Bandwidth Communication Devices") and U.S. patent application Ser. No. 13/398,787, filed on Feb. 16, 2012 (Joakim Axmon et al., "Cellular Communication System Support for Limited Bandwidth Communication Devices"), both of which are hereby incorporated herein by reference. As a result of this initial connection, the network node is informed about the device's capability (step 1003).

Depending on the capability, a suitable RACH signature and corresponding RAR signal reception information (e.g., relative time/frequency grid position at which a RAR signal will be transmitted whenever the device uses the RACH signature in a random access request) are ascertained (step 1005).

Figure 2:
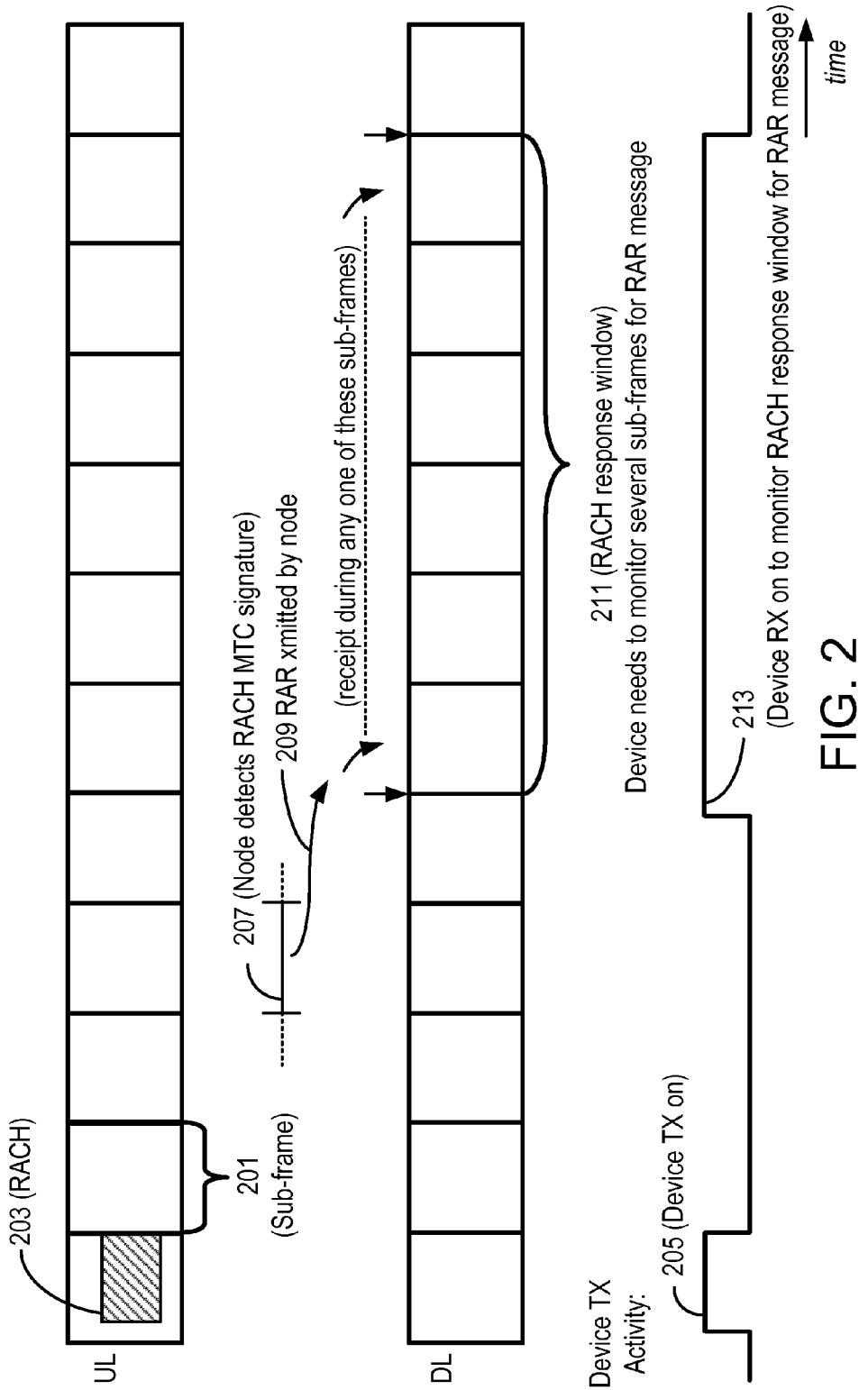
FIG. 2 is a signal timing diagram of a conventional Random Access procedure such as is used in a conventional LTE (or comparable) system.

Different device capabilities have different needs. For instance, MTC devices with a wired power supply may not find power consumption to be a very important issue. In such instances, the RAR window can be chosen to be large in order to permit the network node to prioritize flexibility in its scheduler for optimized spectral efficiency/capacity. Such a RAR window could, for example, resemble the RAR window 211 illustrated in FIG. 2. However, it should be kept in mind that, whereas the conventional techniques always use the RAR window 211 regardless of the device's capabilities, in this instance such a window will have been arrived at only in response to a consideration of the device's capabilities.

By contrast, some other capabilities focusing on battery driven devices need RACH signatures and associated RAR signaling techniques that result in a RAR window such as the RAR window 813 depicted in FIG. 8. Furthermore, some device capabilities might require that the RAR signal be transmitted shortly after the RACH signal is received by the network node. Devices with such capabilities will be assigned RACH signatures with associated RAR signaling occurring, for example, only some few milliseconds (4-10 ms) after the RACH signal. This might impact the scheduler flexibility (capacity) and therefore such MTC capabilities are typically "high end" sensors where fast response and information transfer is needed (e.g., vehicle applications).

Other capabilities need the new RAR having the short RAR window (e.g., the RAR window 811 depicted in FIG. 8) and find it acceptable for the RAR signal to be transmitted after a large delay. Permitting a long delay gives the network node's scheduler a long time to prepare in advance for the RAR signal transmission, so that the impact of this transmission on the network node's data handling capacity can be very limited. These devices (e.g., battery driven sensors gathering non-time critical information) are allocated RACH signatures with associated RAR signals having a small time spread (e.g., one OFDM symbol) but the transmission of the RAR signal could be delayed after receipt of the device's random access request by a large amount (e.g., 50-100 ms).

Finally, the information about the RACH signature and its associated RAR response information is transmitted in a message (for instance via Radio Resource Control—"RRC"—signaling) to the device (1007).

Figure 11:
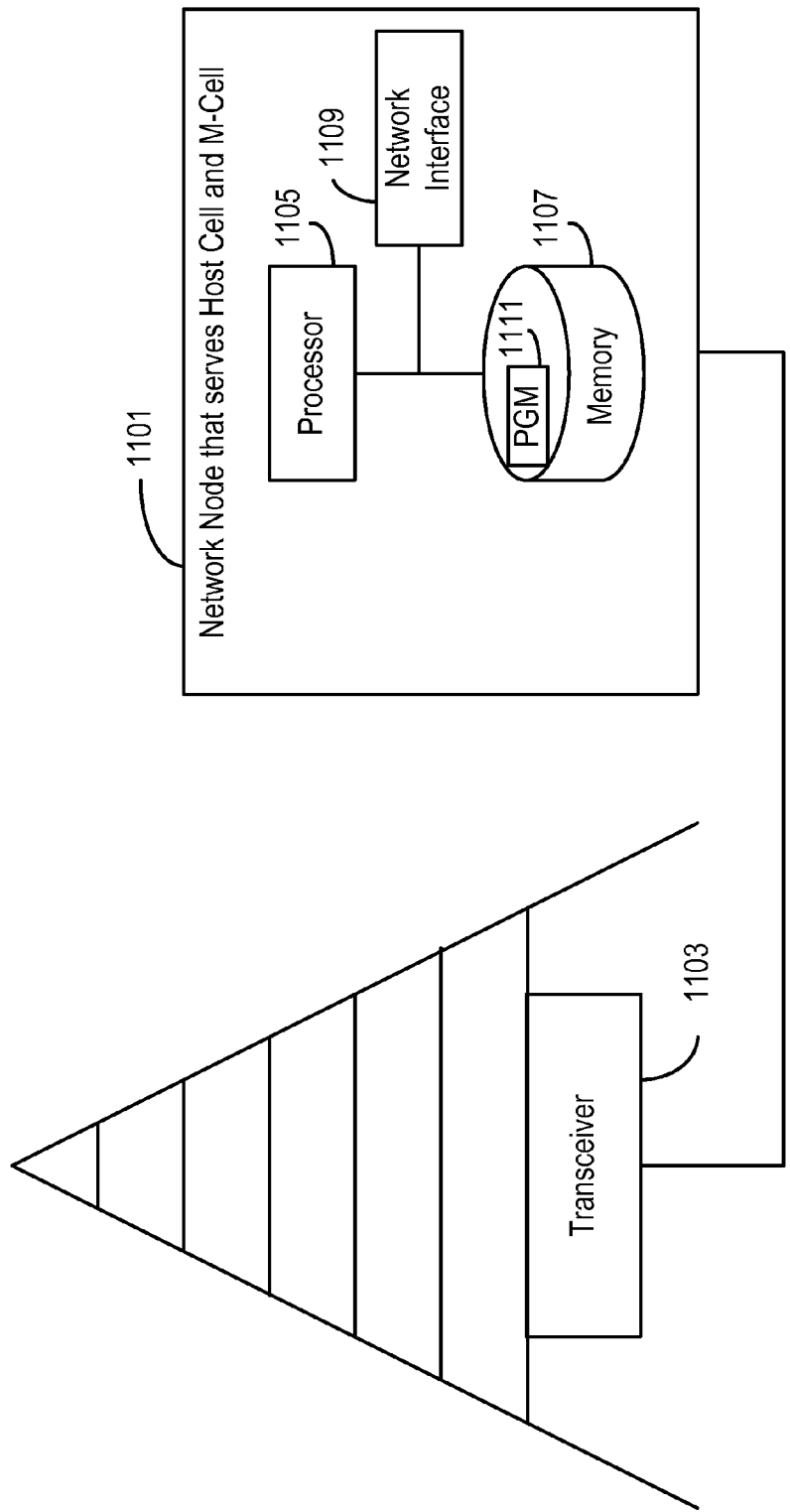
FIG. 11 is a block diagram of system elements for carrying out the various aspects of the invention.

FIG. 11 is a block diagram of system elements for carrying out the various aspects of the invention. In particular, a network node 1101 (e.g., an eNodeB configured to be capable of carrying out the functionality described above) is coupled to a transceiver 1103 that can send and receive signals for serving a variety of devices, such as conventional user equipment (e.g., broadband communication devices) as well as limited capability/bandwidth devices (e.g., MTC devices such as sensors) as described above. The network node 1101 includes circuitry configured to carry out any one or any combination of the random access aspects described above with respect to actions taken by the node. Such circuitry could, for example, be entirely hard-wired circuitry (e.g., one or more Application Specific Integrated Circuits—"ASICs"). Depicted in the exemplary embodiment of FIG. 11, however, is programmable circuitry, comprising a processor 1105 coupled to one or more memory devices 1107 (e.g., Random Access Memory, Magnetic Disc Drives, Optical Disk Drives, Read Only Memory, etc.) and to a network interface 1109. The memory device(s) 1107 store program means 1111 (e.g., a set of processor instructions) configured to cause the processor 1105 to control other node elements so as to carry out any of the node-related aspects described above. The memory device(s) 1107 may also store data (not shown) representing various constant and variable parameters as may be needed by the processor 1105 when carrying out its functions such as those specified by the program means 1111. The network interface 1109 allows the node 1101 to communicate with other nodes (not shown) in the communication system.

Figure 12:
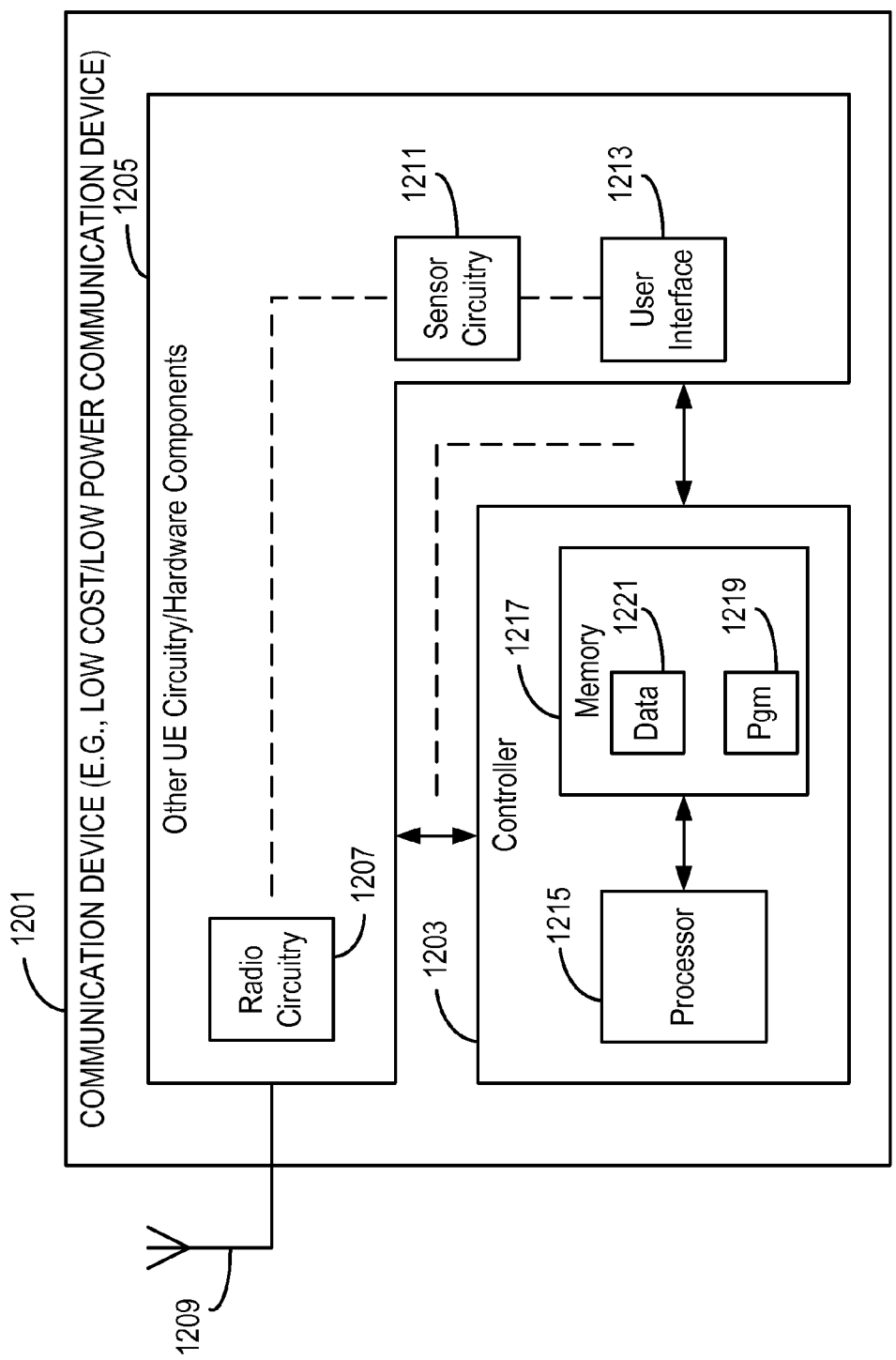
FIG. 12 is a block diagram of a communication device (e.g., a limited bandwidth communication device) in accordance with some exemplary embodiments of the invention.

FIG. 12 is a block diagram of a communication device 1201 (e.g., and without limitation, a low cost/low power communication device, such as an MTC device as used in examples described above). The communication device 1201 includes a controller 1203 coupled to other User Equipment (UE) circuitry/hardware components 1205 that enable the communication device 1201 to perform its application-specific functionality (e.g., operating as a broadband communication device, operating as a sensor of some sort, etc.) and also to operate as a communication device (e.g., to be able to communicate information such as but not limited to sensor data to a server, and possibly also to receive instructions). The other UE circuitry/hardware components 1205 are generally known in the art, and may include such elements as, for example and without limitation, radio circuitry 1207 coupled to one or more antennas 1209, and (optionally) sensor circuitry 1211 (e.g., temperature sensor, acoustical sensor, magnetic field sensor, etc.). The other UE circuitry/hardware may also include some sort of user interface (e.g., display, keyboard, switch(es)) 1213, although applications that call for use of a low cost/low power communication device may have very simplistic needs for a user interface 1213 (e.g., a reset switch) or none at all.

The controller 1203 includes circuitry configured to carry out any one or any combination of the random access aspects described above with respect to device actions. Such circuitry could, for example, be entirely hard-wired circuitry (e.g., one or more ASICs). Depicted in the exemplary embodiment of FIG. 12, however, is programmable circuitry, comprising a processor 1215 coupled to one or more memory devices 1217 (e.g., Random Access Memory, Magnetic Disc Drives, Optical Disk Drives, Read Only Memory, etc.). The memory device(s) store program means 1219 (e.g., a set of processor instructions) configured to cause the processor 1215 to control the other UE circuitry/hardware components 1205 so as to carry out any of the device-related aspects described above. The memory 1217 may also store data 1221 representing various constant and variable parameters as may be needed by the processor 1215 when carrying out its functions such as those specified by the program means 1219.

Figure 13:
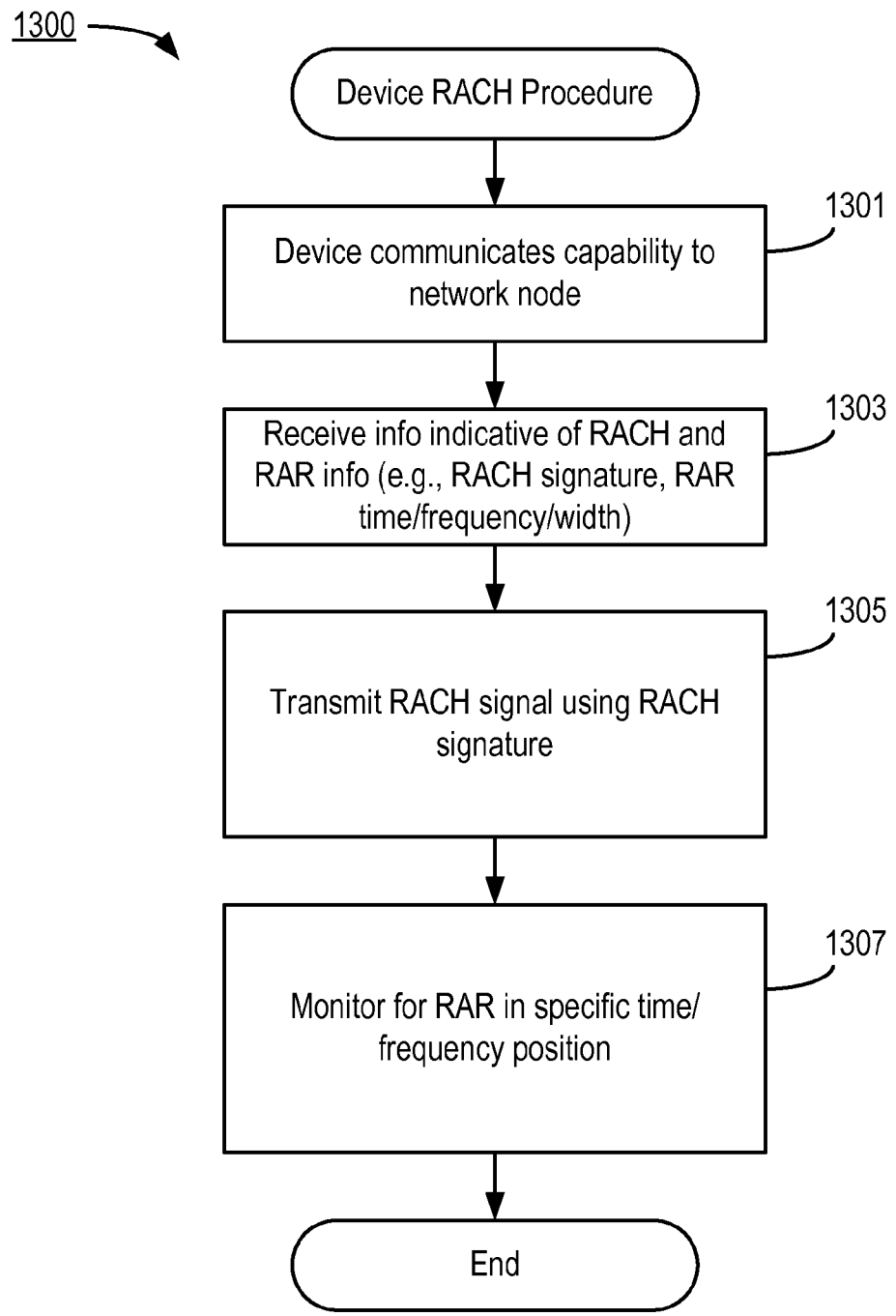
FIG. 13 is, in one respect, a flow chart of steps/processes relating to RACH signature procedures performed by a communication device operating in a cellular communication system in accordance with some but not necessarily all exemplary embodiments of the invention.

FIG. 13 is, in one respect, a flow chart of steps/processes performed by a communication device (e.g., a broadband communication device or a low cost/low power device such as but not limited to an MTC device) in accordance with some but not necessarily all exemplary embodiments of the invention. In another respect, FIG. 13 can be considered to depict exemplary means 1300 comprising the various illustrated circuitry (e.g., hard-wired and/or suitably programmed processor) configured to perform the described functions.

As part of the RACH procedures, the device communicates its relevant capabilities to the network node (step 1301). In this respect, a capability is "relevant" to the RACH procedure if it will be used by the node to tailor its RAR signaling (e.g., to determine a time/frequency at which the RAR will be transmitted, and/or to determine the width of the RAR signal, for example as measured in number of symbols). For example, as mentioned above and without limitation, whether the device has a wired or battery-driven power supply can be used as one basis for determining the size of the RAR window; the device's processing speed may be used as one basis for determining how quickly the device needs to receive the RAR signal after the RACH signal (or alternatively, how much delay the device needs before it is capable of monitoring for the RAR signal after transmitting a RACH signal).

The device then receives, in response, information that is indicative (either directly or indirectly) of the RACH (e.g., what RACH signature to use) and of the RAR signaling procedure (e.g., time/frequency at which the RAR will be transmitted in response to a RACH signal being received by the node, and/or the width of the RAR signal) (step 1303).

At some point, when the device wants to contact the network node, it transmits a RACH signal using the RACH signature that had been earlier received (step 1305).

The device then monitors the RAR window whose time/frequency position (and in some embodiments also duration) was defined by the information received from the network node (step 1307).

One benefit of the random access techniques as described herein is that the amount of time that a device's receiver needs to be turned on for reception of access response signals can be minimized, thereby minimizing the device's power consumption associated with this operation.

The invention has been described with reference to particular embodiments. However, it will be readily apparent to those skilled in the art that it is possible to embody the invention in specific forms other than those of the embodiment described above.

For example, in the description above, the various inventive aspects have been described in terms of RACH and RAR signaling. RACH and RAR signaling are used in LTE systems in case the device requesting access does not have a valid timing alignment (i.e., the network node does not have exact timing knowledge of the device). However, the various random access techniques described above are not limited to the specific case of RACH and RAR signaling. To the contrary, such techniques are also applicable to instances in which the device and network node have established a valid timing alignment, such as when scheduling requests (analogous to RACH requests) and scheduling grants (analogous to RAR signaling) are made. In an LTE system, scheduling requests are transmitted on the Physical Uplink Control Channel (PUCCH).

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a network node that serves a cell in a cellular communication system, wherein an air interface of the cellular communication system is divided up into sequentially occurring frames, each of the frames comprising a plurality of sequentially occurring sub-frames, each of the sub-frames comprising a plurality of sequentially occurring symbols, the method comprising:
   receiving and detecting a request signal transmitted by a device within the cell;
   based at least in part on a characteristic of the request signal that is indicative of one or more device capabilities of the device, ascertaining an associated time/frequency position for transmitting a response signal; and
   transmitting the response signal at the associated time/frequency position,
   wherein the one or more device capabilities comprise one or more of:
      device power capability,
      tolerance for delay between receipt of the request signal and transmission of the response signal, and
      required duration of the response signal; and
   wherein the associated time/frequency position for transmitting the response signal is configured to optimize one or more of usage of radio frequency spectrum and network node scheduler resources while satisfying requirements related to the one or more device capabilities.

2. The method of claim 1, wherein the response signal consists of fewer symbols than are contained in a sub-frame.

3. The method of claim 1, wherein the request is a Random Access Channel (RACH) request and the characteristic of the request signal that is indicative of one or more device capabilities of the device is a RACH signature.

4. The method of claim 1, comprising:
   ascertaining the characteristic of the request signal that is indicative of one or more device capabilities of the device based on the one or more device capabilities; and
   transmitting information to the device, wherein the information is indicative of the characteristic of the request signal that is indicative of one or more device capabilities.

5. The method of claim 1, comprising:
   ascertaining the associated time/frequency position for transmitting a response signal to the device based on the one or more device capabilities.

6. The method of claim 1, wherein a frequency-wise spread of the associated time/frequency position for transmitting the response signal is less than a frequency-wise spread of a symbol.

7. The method of claim 1, wherein each of the symbols is an Orthogonal Frequency Division Multiplexing (OFDM) symbol.

8. The method of claim 1, wherein the response signal consists of one symbol.

9. The method of claim 1, wherein the response signal consists of a number of symbols that is less than a total number of symbols contained within a sub-frame and that is a function of the characteristic of the request signal that is indicative of one or more device capabilities of the device.

10. The method of claim 1, wherein the request is a Scheduling Request signal and the characteristic of the request signal that is indicative of one or more device capabilities of the device is a Scheduling Grant signal.

11. The method of claim 1, comprising:
    controlling a scheduler of the network node based on the associated time/frequency position for transmitting the response signal.

12. A method of operating a device in a cellular communication system having a network node, wherein an air interface of the cellular communication system is divided up into sequentially occurring frames, each of the frames comprising a plurality of sequentially occurring sub-frames, each of the sub-frames comprising a plurality of sequentially occurring symbols, the method comprising:
    communicating device capability information to the network node;
    receiving, in response to the communicated device capability information, information that is indicative of a request procedure and a response procedure to be used by the device when making a request and subsequently monitoring for a request response;
    transmitting a request to the network node based on the received information that is indicative of the request procedure; and
    monitoring received signals to detect a response signal in accordance with the information that is indicative of the response procedure,
    wherein the device capability information comprises information about one or more of:
       device power capability,
       tolerance for delay between receipt of the request signal by the network node and transmission by the network node of the response signal, and
       required duration of the response signal; and
    wherein the response procedure is configured to optimize one or more of usage of radio frequency spectrum and network node scheduler resources while satisfying requirements related to one or more capabilities of the device, and
    wherein the monitoring is performed at a previously determined time and/or frequency position that satisfies requirements related to one or more capabilities of the device.

13. The method of claim 12, wherein the request procedure is a random access procedure, and wherein the response signal is a random access response signal.

14. The method of claim 12, wherein received information that is indicative of the response procedure indicates a time and/or frequency position at which the response signal will be received.

15. The method of claim 13, wherein the response procedure indicates a duration of a response window that is shorter than a duration of a sub-frame.

16. An apparatus for operating a network node that serves a cell in a cellular communication system, wherein an air interface of the cellular communication system is divided up into sequentially occurring frames, each of the frames comprising a plurality of sequentially occurring sub-frames, each of the sub-frames comprising a plurality of sequentially occurring symbols, the apparatus comprising:
    circuitry configured to receive and detect a request signal transmitted by a device within the cell;
    circuitry configured to ascertain, based at least in part on a characteristic of the request signal that is indicative of one or more device capabilities of the device, an associated time/frequency position for transmitting a response signal; and
    circuitry configured to transmit the response signal at the associated time/frequency position, wherein the one or more device capabilities comprise one or more of:
  device power capability,
  tolerance for delay between receipt of the request signal and transmission of the response signal, and
  required duration of the response signal; and
wherein the associated time/frequency position for transmitting the response signal is configured to optimize one or more of usage of radio frequency spectrum and network node scheduler resources while satisfying requirements related to the one or more device capabilities.

17. The apparatus of claim 16, wherein the response signal consists of fewer symbols than are contained in a sub-frame.

18. The apparatus of claim 16, wherein the request is a Random Access Channel (RACH) request and the characteristic of the request signal that is indicative of one or more device capabilities of the device is a RACH signature.

19. The apparatus of claim 16, comprising:
  circuitry configured to ascertain the characteristic of the request signal that is indicative of one or more device capabilities of the device based on the one or more device capabilities; and
  circuitry configured to transmit information to the device, wherein the information is indicative of the characteristic of the request signal that is indicative of one or more device capabilities.

20. The apparatus of claim 16, comprising:
  circuitry configured to ascertain the associated time/frequency position for transmitting a response signal to the device based on the one or more device capabilities.

21. The apparatus of claim 16, wherein a frequency-wise spread of the associated time/frequency position for transmitting the response signal is less than a frequency-wise spread of a symbol.

22. The apparatus of claim 16, wherein each of the symbols is an Orthogonal Frequency Division Multiplexing (OFDM) symbol.

23. The apparatus of claim 16, wherein the response signal consists of one symbol.

24. The apparatus of claim 16, wherein the response signal consists of a number of symbols that is less than a total number of symbols contained within a sub-frame and that is a function of the characteristic of the request signal that is indicative of one or more device capabilities of the device.

25. The apparatus of claim 16, wherein the request is a Scheduling Request signal and the characteristic of the request signal that is indicative of one or more device capabilities of the device is a Scheduling Grant signal.

26. The apparatus of claim 16, comprising:
  circuitry configured to control a scheduler of the network node based on the associated time/frequency position for transmitting the response signal.

27. An apparatus for operating a device in a cellular communication system having a network node, wherein an air interface of the cellular communication system is divided up into sequentially occurring frames, each of the frames comprising a plurality of sequentially occurring sub-frames, each of the sub-frames comprising a plurality of sequentially occurring symbols, the apparatus comprising:
  circuitry configured to communicate device capability information to the network node;
  circuitry configured to receive, in response to the communicated device capability information, information that is indicative of a request procedure and a response procedure to be used by the device when making a request and subsequently monitoring for a request response;
  circuitry configured to transmit a request to the network node based on the received information that is indicative of the request procedure; and
  circuitry configured to monitor received signals to detect a response signal in accordance with the information that is indicative of the response procedure,
  wherein the device capability information comprises information about one or more of:
    device power capability,
    tolerance for delay between receipt of the request signal by the network node and transmission by the network node of the response signal, and
    required duration of the response signal; and
  wherein the response procedure is configured to optimize one or more of usage of radio frequency spectrum and network node scheduler resources while satisfying requirements related to one or more capabilities of the device, and
  wherein the circuitry configured to monitor is configured to do so at a previously determined time and/or frequency position that satisfies requirements related to one or more capabilities of the device.

28. The apparatus of claim 27, wherein the request procedure is a random access procedure, and wherein the response signal is a random access response signal.

29. The apparatus of claim 28, wherein the response procedure indicates a duration of a response window that is shorter than a duration of a sub-frame.

30. The apparatus of claim 27, wherein received information that is indicative of the response procedure indicates a time and/or frequency position at which the response signal will be received.

* * * * *